(12) United States Patent
Bryant, III

(10) Patent No.: US 6,398,264 B1
(45) Date of Patent: Jun. 4, 2002

(54) THERMALLY ACTIVATED JOINING APPARATUS

(75) Inventor: Melvin A. Bryant, III, Decatur, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/528,794

(22) Filed: Mar. 16, 2000

(51) Int. Cl.⁷ .............................................. H05B 3/58
(52) U.S. Cl. ...................... 285/21.2; 285/21.1
(58) Field of Search .......................... 285/21.1, 21.2, 285/368

(56) References Cited

U.S. PATENT DOCUMENTS

| | | | | |
|---|---|---|---|---|
| 2,423,848 A | * | 7/1947 | O'Connor | 285/21.1 X |
| 2,992,838 A | * | 7/1961 | Wallace | 285/21.1 |
| 3,094,452 A | * | 6/1963 | Riegen et al. | 285/21.2 X |
| 3,849,630 A | * | 11/1974 | Halliday | 285/21.2 X |
| 3,943,334 A | * | 3/1976 | Sturm | 285/21.2 X |
| 4,176,274 A | * | 11/1979 | Lippera | 285/21.1 X |
| 4,894,521 A | * | 1/1990 | Evans | 285/21.2 X |
| 4,933,037 A | * | 6/1990 | De Jong | 285/21.2 X |
| 5,156,420 A | * | 10/1992 | Bokor et al. | 285/21.2 |
| 5,368,669 A | * | 11/1994 | Maine et al. | 285/21.2 X |
| 5,398,974 A | * | 3/1995 | Mizukawa et al. | 285/21.1 |

FOREIGN PATENT DOCUMENTS

FR      1166480    * 11/1958 .................. 285/368

* cited by examiner

*Primary Examiner*—Lynne H. Browne
*Assistant Examiner*—David E. Bochna
(74) *Attorney, Agent, or Firm*—James J. McGroary

(57) ABSTRACT

A thermally activated joining apparatus is provided for reversibly joining piping components of a fluid management system. The joining apparatus includes a thermally activated sealant layers for securing the components together in a leakage free manner. A thermal conductor includes a ring shaped contact portion disposed between the layers for transferring heat from one or more heating elements to the sealant layers. After the seal in place, the components can later be disconnected by supplying heat from the heating element or elements through the thermal conductor to the sealant layers to cause breaking of the seal and thereby enable separation of components.

8 Claims, 1 Drawing Sheet

THERMALLY ACTIVATED JOINING APPARATUS

ORIGIN OF THE INVENTION

This invention was by an employee of the United States Government and may be manufactured and used by or for the Government for Governmental purposes without the payment of royalties.

BACKGROUND OF THE INVENTION

1. Field of the Invention

The present invention relates to sealing arrangements for fluid management systems, i.e., piping systems, and more particularly, to a reversible thermally activated joining apparatus for sealing and unsealing components of such a fluid management system.

2. Related Art

Many methods are known for joining pipes and similar components. Typical methods include welding, brazing, soldering, bonding, and mechanical fastening. It is, of course, important that the resultant pipe joint not leak and in many applications, such as those involving highly corrosive, highly explosive and/or life threatening fluids, it is essential that the joint be leak free, i.e., to provide zero leakage. A problem is presented when a joint in a fluid management system is to have separable interfaces, i.e., where the pipe joint is to be capable of being connected, disconnected and reconnected, and the joint is to still provide zero leakage. Fluid management systems with separable interfaces require high maintenance. Welded connections or interfaces can be broken and reconnected but this is a costly and difficult process.

SUMMARY OF THE INVENTION

The invention is concerned with the provision of an apparatus which affords zero leakage in fluid management (piping) systems while also providing separable, non-welded joint interfaces. The invention replaces conventional gaskets which are typically used for joint sealing.

In accordance with the invention, a thermally activated apparatus is provided for joining first and second fluid carrying piping components in a leakproof manner, the piping components including facing surfaces defining a joint interface and each of the piping components including a bore, the apparatus comprising:

a thermally activated sealant material in contact with the facing surfaces of the piping components at the joint interface and arranged so as to provide a seal at the joint interface while permitting fluid flow between the bores of the piping components;

a thermal conductor in thermal contact with said sealant material for conducting heat to the sealant material to cause thermal activation of the sealant material; and a heating element directly connected to the thermal conductor for supplying sufficient heat to said thermal conductor to thermally activate the sealant material so as to cause release of the seal at the joint interface and thereby permit separation of the piping components.

Preferably, the sealant material comprises first and second sealant layers in contact with respective facing surfaces of the joint interface, and the thermal conductor includes a contact portion disposed between, and in contact with, the first and second layers. Advantageously, the contact portion of the thermal conductor comprises a flat ring member. In a preferred implementation, the thermal conductor further includes a connection portion for connecting the ring member to the heating element. Advantageously, the apparatus includes a plurality of heating elements and the thermal conductor includes a like plurality of these connection portions connecting the ring member to the heating elements.

In a beneficial implementation, the piping components include radial flanges including means for receiving mechanical fasteners (e.g., bolts) for connecting the piping components together, the facing surfaces of the piping components comprise substantially flat annual shaped surfaces located centrally of the piping components radially inwardly of the flanges, and the sealant material comprises an annular sealant element disposed between and contacting the annular shaped surfaces of the piping components.

Further features and advantages of the present invention will be set forth in, or apparent from, the detailed description of preferred embodiments thereof which follows.

BRIEF DESCRIPTION OF THE DRAWINGS

The single FIGURE in the drawings is an exploded longitudinal cross section view of a thermally activated joining apparatus in accordance with a preferred embodiment of the present invention.

DESCRIPTION OF THE PREFERRED EMBODIMENTS

Figure 1:
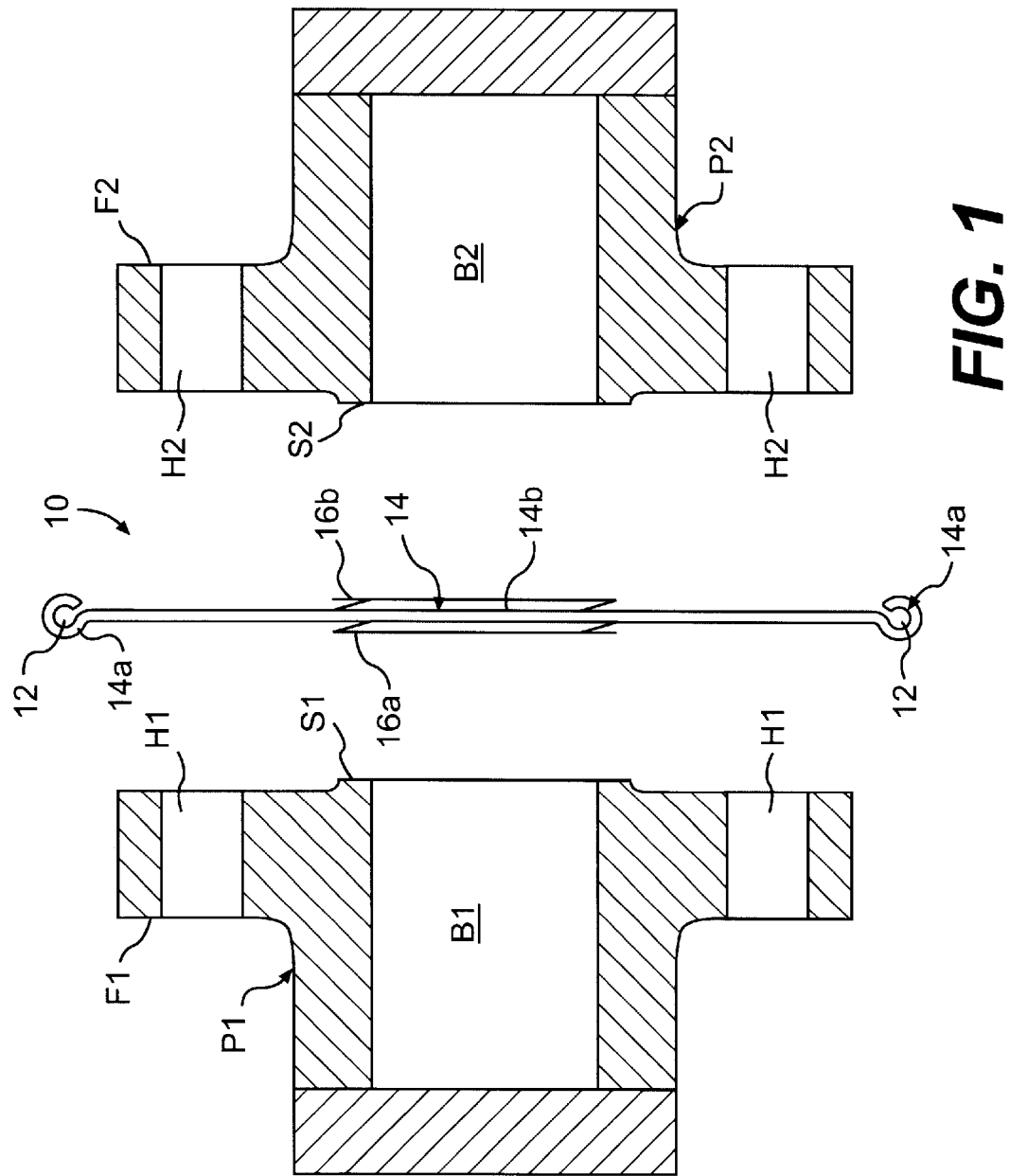

Referring to the drawings, there is shown a preferred embodiment of the thermally activated joining apparatus of the invention. The apparatus, which is generally denoted 10, is used to join separable interfaces of a first piping component P1 and a second piping component P2. The piping components P1 and P2 include radially extending flanges F1 and F2 and annular mating surfaces S1 and S2 which form the joint interface between flanges P1 and P2 and which surround the respective pipe bores B1 and B2. Bolt holes H1 and H2 enable joining of the flanges F1 and F2 by suitable fasteners such as bolts (not shown). The thermally activated joining apparatus 10 basically comprises a heating element 12, a thermal conductor 14, and a thermally activated sealant 16 formed, in the illustrated embodiment, as two layers 16a and 16b.

Considering the specific components of the apparatus 10 in more detail, in a preferred embodiment of the apparatus 10 illustrated in the drawings, a single annular heating element 12 is employed although multiple heater elements can be used as well. The heating element 12 provides thermal energy to the thermal conductor 30. Alternatively, rather than supplying heat energy directly thereto, the heating element 12 can be used to convert the supplied energy other than heat into heat. For example, the heating element 12 can comprise a wire or wires which receive electrical current that is converted into heat by the electrical resistance of the wires. The heating element 12 is manufactured from a suitable material or alloy that does not melt, oxidize, or otherwise corrode in receiving energy from the energy source and transferring the energy to the thermal conductor 14.

The thermal conductor 14 includes hooks or eyelets 14a which attach to the heating element 12. Conductor 14 further includes a central ring portion or annulus 14b which is of a size and shape matching that of the annular surfaces S1 and S2 of flanges F1 and F2. The thermal conductor 14 receives heat from the heating element 12, and transfers that heat to the sealant layers 16a and 16b. The thermal conductor 14 must transfer a sufficient amount of heat to thermally activate the sealant layers 16a and 16b. The exact quantity of heat necessary for this purpose will depend upon a number of factors including the specific dimensions and materials of the sealant layers 16a and 16b. The thermal conductor 14 is manufactured from a material or alloy which has a high thermal conductivity and which does not melt, oxidize, or otherwise corrode in receiving heat from the heating element 12 and transferring heat to the sealant layers 16a and 16b.

Sealant layers 16a and 16b are of a ring or annular shape and are directly affixed to the ring shaped portion 14b of the thermal conductor 14 on opposite sides thereof. The thermal conductor 14 transfers heat to the sealant layers 16a and 16b to cause thermal activation thereof and to thus produce a seal joint between the mating sealing surface areas S1 and S2. As indicated above, this is a reversible process, i.e., once the seal is fully activated, joint separation can be effected at a later time by reheating the sealant layers 16a and 16b.

In this reversible process, the thermal conductor 14 supplies a sufficient quantity of heat to the sealant layers 16a and 16b to cause the sealant material to undergo a chemical or mechanical relaxation or softening process which provides sufficient plastic deformation or flow of the sealant material to enable separation of the piping components P1 and P2 after many mechanical fasteners (not shown) are disconnected.

The sealant layers 16a and 16b are comprised of a thermally activated sealant having sufficient strength to tightly hold the flanges F1 and F2 together in cooperation with the system fasteners (not shown). In an important application, the sealant layers 16a and 16b are capable of operation at elevated or cryogenic temperatures and of withstanding pressure differentials of at least 10,000 psi.

Examples of materials suitable for the sealant layers 16a and 16b include metals, thermoplastics, and composites having a contiguous metal or thermoplastic matrix. Examples of metals include pure metals, alloys, solder alloys, and brase alloys. Examples of thermoplastics include pure thermoplastics, thermoplastic blends, thermoplastic mixtures, or thermoplastic alloys. Examples of composites include reinforced or filled composites.

In general, the sealant layers 16a and 16b define openings of sufficient size to allow the flow of fluid between the bores B1 and B2 of piping components P1 and P2. As indicated above, in the preferred embodiment, the adhesion layers 16a and 16b are annular and form flat rings to facilitate quick disconnection.

Assembly of the joining apparatus is readily accomplished. First, the material that is used to form the sealant layers 16a and 16b is applied to the thermal conductor 14 and the heating element 12 is directly attached to the conductor 14. The conductor 14 is then properly mounted between the surfaces S1 and S2, and the sealant layers 16a and 16b are brought into contact with the respective opposed mating surfaces S1 and S2 of the piping components P1 and P2. With all of the elements of apparatus 10 properly in place, the heat source (not shown) is activated and the heating element 12, or elements, transfer heat to the conductor 14 which is conducted to the sealant layers 16a and 16b to provide thermal activation of these layers and attendant sealing of the joint.

It will be understood that the sealant layers 16a and 16b need not be discrete, separate layers and can, for example, surround a portion of the thermal conductor 14 and contact each other so as to form what is essentially a single sealant body containing the conductor 14.

Although the invention has been described in detail with respect to the preferred embodiments thereof, it will be apparent to those skilled in the art that variations and modifications can be effected in these embodiments without departing from the spirit and scope of the invention.

What is claimed is:

1. A thermally activated apparatus for joining first and second fluid carrying piping components in a leakproof manner, said piping components including facing surfaces defining a joint interface and each of said piping components including a bore, said apparatus comprising:

a thermally activated sealant material in contact with the facing surfaces of the piping components at the joint interface and arranged so as to provide a seal at the joint interface while permitting fluid flow between the bores of the piping components;

a thermal conductor in thermal contact with said sealant material for conducting heat to the sealant material to cause thermal activation of the sealant material, said thermal conductor comprising a heat conductive member of a high thermal conductivity and including a contact portion having opposed flat surfaces, and said thermally activated sealant material including at least one sealant layer disposed between a respective facing surface of said joint interface and said contact portion of said heat conductive member in contact with one of said flat surfaces of said heat conductive member; and a heating element directly connected to the thermal conductor for supplying sufficient heat to said thermal conductor to thermally activate the sealant material so as to cause release of the seal at the joint interface and thereby permit separation of the piping components.

2. The apparatus of claim 1 wherein said sealant material comprises first and second sealant layers in contact with respective facing surfaces of said joint interface, said contact portion of said heat conductive member being disposed between said first and second layers, and said opposed flat surfaces of said heat conductive member being in contact with said first and second layers.

3. The apparatus of claim 2 wherein said contact portion of said thermal conductor comprises a flat ring member.

4. The apparatus of claim 3 wherein said thermal conductor further includes a connection portion for connecting the ring member to the heating element.

5. The apparatus of claim 1 wherein said piping components include radial flanges including means for receiving mechanical fasteners for connecting the piping components together, and the facing surfaces of the piping components comprising substantially flat annual shaped surfaces located centrally of the piping components radially inwardly of the flanges, said sealant material comprising an annular sealant element disposed between, and in contact with, the annular shaped surfaces of the piping components.

6. In a fluid management system including first and second fluid carrying piping components each including means for enabling the piping components to be joined together by mechanical fasteners, facing surfaces defining a joint interface between the piping components and communicating bores defined by the piping components, a thermally activated apparatus for joining the first and second fluid carrying piping components in a leakproof manner, said apparatus comprising:

a thermally activated sealant material comprising first and second sealant layers in contact with the facing surfaces of the piping components at the joint interface and arranged so as to provide a seal at the joint interface while permitting fluid flow between the bores of the piping components;

a thermal conductor including a flat contact portion disposed between said first and second sealant layers and having first and second opposed flat surfaces in thermal contact with said first and second sealant layers for conducting heat to the sealant layers to cause thermal activation of the sealant material; and at least one heating element connected to the thermal conductor for supplying sufficient heat to said thermal conductor to thermally activate the sealant material so as to cause release of the seal at the joint interface and thereby permit separation of the piping components by disconnection of the mechanical fasteners.

7. The apparatus of claim 6 wherein said sealant layers are annular in shape and said contact portion of said thermal conductor comprises a flat ring member.

8. The apparatus of claim 7 wherein said thermal conductor further includes a connection portion for connecting the ring member to the heating element.

* * * * *